PHOTOGRAPHIC DIGITAL READOUT DEVICE

Filed April 26, 1956 2 Sheets-Sheet 1

INVENTOR.
JACOB M. SACKS
ELI BLUTMAN
BY G. D. O'Brien
V. C. Muller
ATTORNEYS

Sept. 20, 1960 E. BLUTMAN ET AL 2,953,776

PHOTOGRAPHIC DIGITAL READOUT DEVICE

Filed April 26, 1956 2 Sheets-Sheet 2

INVENTOR.
JACOB M. SACKS
ELI BLUTMAN

BY

ATTORNEYS.

United States Patent Office 2,953,776

Patented Sept. 20, 1960

2,953,776

PHOTOGRAPHIC DIGITAL READOUT DEVICE

Eli Blutman, Riverside, and Jacob M. Sacks, Corona, Calif., assignors to the United States of America as represented by the Secretary of the Navy Filed Apr. 26, 1956, Ser. No. 580,972

14 Claims. (Cl. 340—324)

(Granted under Title 35, U.S. Code (1952), sec. 266)

The invention described herein may be manufactured and used by or for the Government of the United States of America for governmental purposes without the payment of any royalties thereon or therefor.

This invention relates to a photographic digital readout device and more particularly to a method and apparatus for producing in permanent readable form the digital output of a computer or similar device which generates numbers, letters or other symbols which it is desired to record.

Many previous methods and apparatus for recording information have been devised. One of these is the automatic typewriter which can convert electronic digital information into typed form. However, this method is generally too slow and requires intermediate storage of the information, before it is typed, on magnetic or punched tape or punched cards with subsequent slowdown for printing out information. This arrangement has the disadvantages of requiring elaborate equipment and makes it impossible to record at the same rate the information is presented. The mechanical printers also have the disadvantage of requiring frequent maintenance and repair for optimum high speed operation.

Other printing devices having relatively high speed in the range of several hundred lines a second are primarily electronic. Certain of these printers require special current sensitive paper which must be stored in special containers to retain moisture which would be a serious limitation in practice. Other printers using ordinary paper are extremely complex, using a very high number of tubes and diodes per printing assembly which would be multiplied by the number of digits required per line to make the system prohibitively complex. Another data printer using tape does not produce a very legible record and is not readily duplicated, since it utilizes matrix electrodes which also must be cleaned periodically and replaced frequently when operating at high speeds. The fumes from this latter recording process are toxic.

Certain photographic systems make use of a special cathode ray tube on which the characters are displayed and successively photographed, however, this system requires specially built and expensive cathode ray tubes having provision for selective deflection of the electron beam. None of these devices have proven to be completely satisfactory in their present state of development.

In one preferred embodiment of the present invention the digital output of a computer or similar device is recorded on photographic film as the film moves continuously in a camera and has imaged upon it by the camera lens the digital presentation of a number generator. The digital presentation may be made in any one of several patterns but in each case the number is illuminated for a relatively short time, so that its image on the film moves only a very short distance and therefore does not smear appreciably. One preferred method is to use a numeral matrix wherein any one of the ten numerals from zero to nine may be formed by illuminating certain selected portions of the matrix. Since the line elements must be illuminated and extinguished rapidly with "on" time of less than a millisecond for a reasonably rapid readout rate, illuminating means such as electroluminescent materials is preferred which is excited by a short burst of high frequency voltage in the manner disclosed in a copending application of Jacob M. Sacks for a Method of Excitation for Electroluminescent Materials, Serial No. 562,616, filed January 31, 1956, now Patent No. 2,813,229, wherein is disclosed specific circuitry for rapidly exciting and extinguishing a series of electroluminescent elements. Other means for illuminating the characters would be a series of plastic plates with characters such as the numerals from zero to nine engraved on each and the desired plastic sheet edge-lighted with a gas flash tube causing the engraved number to become visible and thus photographed, or a gas glow lamp with numerals formed of wire and a common anode in an argon gas atmosphere.

One object of the present invention is to provide a photographic digital readout device which will produce in permanent readable form the digital output of a computer or similar device which generates a series of pulses representing numerals, letters or other symbols which it is desired to record.

Another object of the present invention is to provide a method and apparatus for recording the digital output of an electronic device on photographic film at an extremely high rate of speed and utilizing electronic circuitry and apparatus which is relatively simple and inexpensive.

A further object of the present invention is to provide a photographic method and apparatus for recording information in the form of high speed pulses without intermediate storage or slow down for printing out.

Other objects and many of the attendant advantages of this invention will be readily appreciated as the same becomes better understood by reference to the following detailed description when considered in connection with the accompanying drawings wherein.

Figure 1:
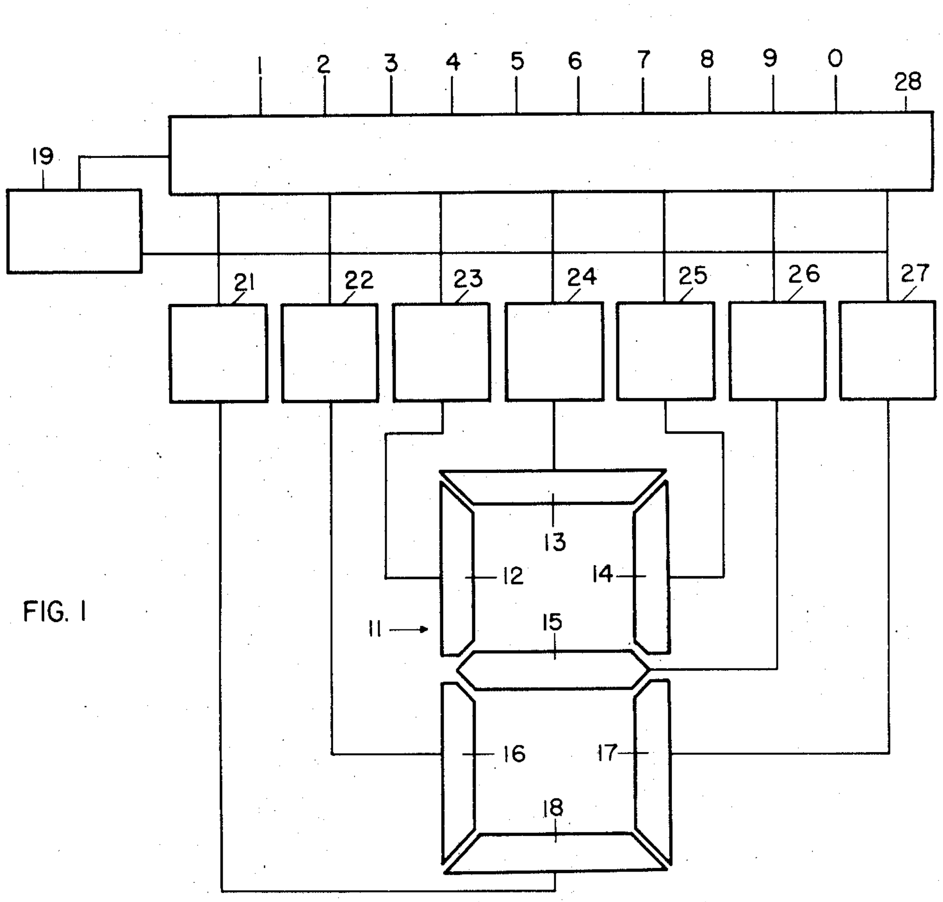
Fig. 1 is a schematic block diagram illustrating one preferred embodiment of the present invention.

Referring now to the drawings in detail, one preferred form of the method and apparatus of the present invention is illustrated in Fig. 1 wherein a matrix 11 is formed of a plurality of elements 12, 13, 14, 15, 16, 17, and 18 which are preferably formed of electroluminescent material sandwiched between two plates to form a capacitive element which may be excited by short bursts of high frequency energy utilizing the specific circuitry illustrated in detail in the copending application by Jacob M. Sacks mentioned supra.

Such circuitry is illustrated herein in block diagram form by the burst generator 19 and the element drivers 21, 22, 23, 24, 25, 26 and 27.

The element drivers each receive a burst of high frequency energy from the burst generator 19 at a frequency such as 10 kilocycles but are gated in either an "on" or an "off" position by the output from the diode matrix 28 which receives the digital input from the computer or similar device.

The diode matrix 28 selectively controls the elements of the matrix 11 to display the desired numeral for a very short period of time in the order of one millisecond. For example, if the numeral 3 is received from the computer in digital form the diode matrix would provide an "on" gating signal to the element drivers 24, 25, 26, 27 and 21 to illuminate the matrix elements 13, 14, 15, 17 and 18 respectively. The number is illuminated at a duty cycle which is the percentage of time "on" of approximately 10 to 20 percent. However, sufficient light output is provided during this relatively short period to provide adequate illumination for photographic recording.

Figures 2, 3:
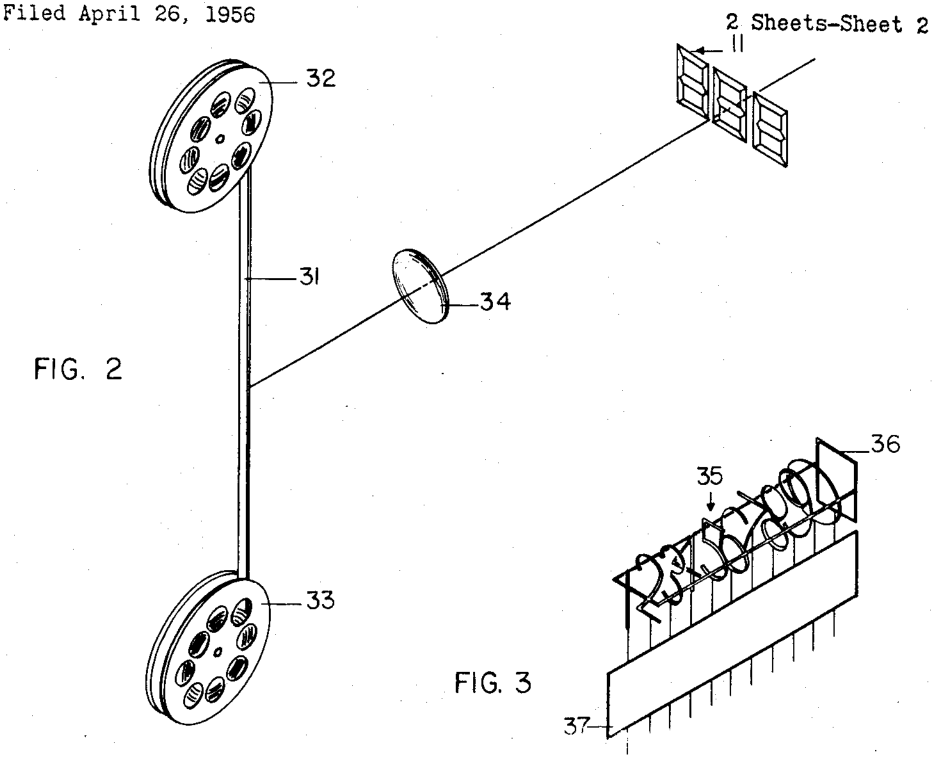
Fig. 2 is a schematic diagram illustrating the photographic system for recording the numerical display.
Fig. 3 is a pictorial view illustrating one modification of the numerical display.

Referring now to Fig. 2, photographic means are schematically illustrated for recording the numerical output from a plurality of matrices such as that illustrated in Fig. 1 at 11. The film 31 moves continuously from one reel 32 to a second reel 33 with the image of the three matrices 11 focused on the film by a lens 34. It will be apparent that the three numbers which are simultaneously illuminated for a very short period of time will form an image at one position on the film without substantial blurring and the film will have moved sufficiently before the next period of illumination to prevent overlap by the next series of numbers which form an image at a different position.

A second method of numerical display is schematically illustrated in the pictorial view in Fig. 3 wherein a series of wire numerals 35 from one through zero are mounted one behind the other preferably in a glass envelope in an atmosphere of argon to form a gas glow lamp. Voltage applied between any one of the numbers 35 and a common anode 36 by the pulse gating circuit 37 causes the selected number to glow. The pulse gating circuit 37 receives the digital input from a computer or similar device in rapid pulse form. By proper positioning of the anode 36 and the proper choice of voltage all of the numbers 35 may be made equally bright. Since the glow is larger than the wire, shadowing by the non-glowing wires is relatively minor.

Figure 4:
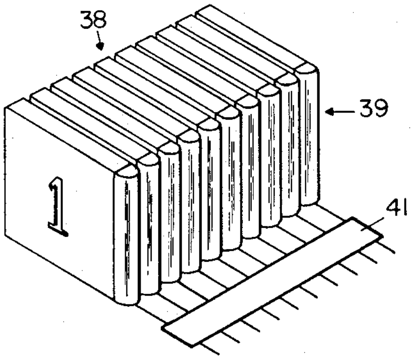
Fig. 4 is a pictorial view of another modification of a pictorial display for use in conjunction with the present invention.

In the modification illustrated pictorially in Fig. 4 a series of plates 38 are formed of plastic with the numbers one to zero engraved on each.

The desired plastic plate is selectively edge-lighted by one of a series of gas flash tubes 39 thus causing the engraved number to become visible and capable of being photographed by apparatus such as that illustrated in Fig. 2. The gas flash tubes 39 are illustrated schematically and each of the tubes would consist of a properly shielded gas flash tube controlled by a single pulse from the pulse gating circuitry 41.

Obviously many modifications and variations of the present invention are possible in the light of the above teachings. It is therefore to be understood that within the scope of the appended claims the invention may be practiced otherwise than as specifically described.

What is claimed is:

1. A digital readout device including means for forming any one of a series of characters at a substantially fixed position, said characters being adapted to be illuminated and extinguished rapidly, and electronic means for converting electronic digital information directly into very short bursts of energy and selectively applying said energy to illuminate a desired character for a very short period of time whereby the character is not blurred.

2. A device as set forth in claim 1 wherein said characters are formed by a series of individual line elements which are selectively illuminated to form the desired character.

3. A device as set forth in claim 2 wherein said characters are formed by a series of transparent plates with characters inscribed thereon and gas flash tube means are provided for edge-lighting each of said plates for selectively illuminating said characters.

4. A device as set forth in claim 1 wherein said characters are formed of wire in a gas atmosphere with a common anode.

5. A device as set forth in claim 1 wherein said characters are formed by a series of line elements with each of said elements being formed of an electroluminescent material adapted to be energized by very short bursts of high frequency energy.

6. A device as set forth in claim 1 wherein said characters are formed by a series of line elements with each of said elements being formed of an electroluminescent material between two plates to form a capacitive element adapted to be energized by very short bursts of high frequency energy.

7. In a digital readout device including recording means, means comprising means for forming any one of a series of characters in a single substantially fixed position, said characters being adapted to be illuminated and extinguished rapidly and electronic means for converting electronic digital information directly into very short bursts of energy and selectively applying said energy to illuminate a desired character for a very short period of time whereby the character is not blurred appreciably, said characters being formed by a series of line elements with each of said elements being formed of an electroluminescent material adapted to be energized selectively to form the desired character.

8. A digital readout device comprising means for forming any one of a series of characters in a single substantially fixed position, said characters being adapted to be illuminated and extinguished rapidly, and electronic means for converting electronic digital information directly into very short bursts of energy and selectively applying said energy to illuminate a desired character for a very short period of time whereby the character is not blurred appreciably, said characters being formed by a series of line elements with each of said elements being formed of an electroluminescent material adapted to be energized selectively to form the desired character.

9. A digital readout device comprising means for forming any one of a series of characters in a single substantially fixed position, said characters being adapted to be illuminated and extinguished rapidly, electronic means for converting electronic digital information directly into very short bursts of energy and selectively applying said energy to illuminate a desired character for a very short period of time whereby the character is not blurred appreciably.

10. A device as set forth in claim 9 wherein said characters are formed by a series of line elements with each of said elements being formed of an electroluminescent material adapted to be energized selectively to form the desired character.

11. A digital readout device comprising means for forming any one of a series of characters in a single substantially fixed position, said characters being adapted to be illuminated and extinguished rapidly, and means for generating very short bursts of energy and selectively applying said energy to illuminate a desired character for a very short period of time whereby the character is not blurred appreciably.

12. A device as set forth in claim 11 wherein said characters are formed by a series of line elements with each of said elements being formed of an electroluminescent material adapted to be energized selectively to form the desired character.

13. A digital readout device comprising means for forming any one of a series of characters in a single substantially fixed position, said characters being adapted to be illuminated and extinguished rapidly, and means for selectively applying very short bursts of energy to illuminate a desired character for a very short period of time.

14. In a digital readout device of the type adapted to have permanent recordings made thereof, means including means for forming any one of a series of characters in a single substantially fixed position, said characters being adapted to be illuminated and extinguished rapidly, said characters being formed by a series of line elements with each of said elements being formed of a self luminous material adapted to be energized selectively to form a desired character, and means for generating very short bursts of energy and selectively applying said energy to illuminate a desired character for a very short period of time whereby the character is not blurred appreciably.

References Cited in the file of this patent

UNITED STATES PATENTS

| | | |
|---|---|---|
| 862,343 | Nesbitt | Aug. 6, 1907 |
| 1,317,406 | Siemens | Sept. 30, 1919 |
| 1,660,254 | Carroll | Feb. 21, 1928 |
| 2,137,360 | Skelsey | Nov. 22, 1938 |
| 2,251,998 | Goodale | Aug. 12, 1941 |
| 2,346,251 | Bryce | Apr. 11, 1944 |
| 2,348,535 | Goodale | May 9, 1944 |
| 2,551,683 | Levy | May 8, 1951 |
| 2,618,697 | Metcalf | Nov. 18, 1952 |
| 2,694,785 | Williams | Nov. 16, 1954 |
| 2,698,915 | Piper | Jan. 4, 1955 |
| 2,730,708 | McNaney | Jan. 15, 1956 |
| 2,769,939 | Williams | Nov. 6, 1956 |
| 2,773,216 | Edmonds | Dec. 4, 1956 |
| 2,848,638 | Smith | Aug. 19, 1958 |